United States Patent [19]

Zaki

[11] 4,040,440

[45] Aug. 9, 1977

[54] SILENCED VALVE CONSTRUCTION

[75] Inventor: Moustafa A. Zaki, Newburgh, N.Y.

[73] Assignee: Spence Engineering Company, Walden, N.Y.

[21] Appl. No.: 587,845

[22] Filed: June 18, 1975

[51] Int. Cl.² .............................................. F16K 47/02
[52] U.S. Cl. .................................... 137/375; 137/494; 251/120
[58] Field of Search ............. 251/127, 120, 121, 61.4, 251/118, 126; 137/625.3, 625.33, 505.35, 505.34, 505.37, 375

[56] References Cited

U.S. PATENT DOCUMENTS

| 2,024,270 | 12/1935 | Binnall | 251/120 X |
|---|---|---|---|
| 2,026,506 | 12/1935 | Binnall | 251/121 X |
| 2,230,914 | 2/1941 | Sherman | 251/61.4 |
| 2,483,163 | 9/1949 | Warren et al. | 251/118 X |
| 2,687,746 | 8/1954 | Argentieri | 251/121 X |
| 3,042,078 | 7/1962 | Rosell | 137/625.3 |
| 3,159,377 | 12/1964 | Samour | 137/375 X |
| 3,503,416 | 3/1970 | Clarkson | 137/375 |
| 3,821,968 | 7/1974 | Barb | 137/625.3 |
| 3,908,698 | 9/1975 | Baumann | 137/625.3 |

FOREIGN PATENT DOCUMENTS 1,650,401  10/1970  Germany .............................. 251/127

Primary Examiner—Arnold Rosenthal
Attorney, Agent, or Firm—Hopgood, Calimafde, Kalil, Blaustein & Lieberman

[57] ABSTRACT

The invention contemplates sound-absorbent structure so built into the downstream side of a flow-control valve as to absorb noise generated by fluid passage through the valve, without presenting obstruction to the flow controlled by the valve.

19 Claims, 3 Drawing Figures

SILENCED VALVE CONSTRUCTION

The invention relates to structure built into a valve for absorbing noise created by expansion of fluid passing through the restriction of the valve.

The various attempts which have thus far been made to reduce valve noise of the character indicated have included multiple-stage reduction in pressure, tortuous flow-path techniques, and break-up of the fluid stream into plural smaller streams. In general, these may be classed as series-operative techniques, in that they interpose an impedance of one form or another in the path of fluid flow. While such techniques do produce a noise-reducing result, they are subject to certain objectionable features, including:

a. The treatment may call for unduly critical customizing, for a particular valve size, configuration, pressure, and design-flow range.
b. The requisite passage restrictions necessarily reduce the capacity of the valve.
c. The treatment produces only limited noise reduction and may, in certain cases, give rise to added sources of noise.

It is an object of the invention to provide an improved noise-reducing valve construction, self-contained within a valve assembly.

Another object is to meet the above object while also substantially avoiding deficiencies of past techniques.

A specific object is to provide a valve with hitherto unavailable noise-reduction capability.

Another specific object is to provide such a valve in which the noise-reduction feature does not materially affect flow capacity of the valve; stated in other words, it is a specific object to achieve noise reduction in a valve without placing an impediment in series with the flow path.

Other specific objects are to provide a noise-reduction treatment (a) which is generally applicable and which is therefore not critical as to each particular valve and its operating conditions, (b) which treats noise and still leaves other parts of the valve adaptable to special-purpose arrangements, such as for balancing the valve, (c) which protects the valve stem against direct impingement by fluids such as steam, and (d) which is relatively easy and inexpensive to manufacture.

Other objects and various further features of novelty and invention will be pointed out or will occur to those skilled in the art from a reading of the following specification, in conjunction with the accompanying drawings. In said drawings, which show, for illustrative purposes only, a preferred form of the invention:

Figures 1, 2, 3:
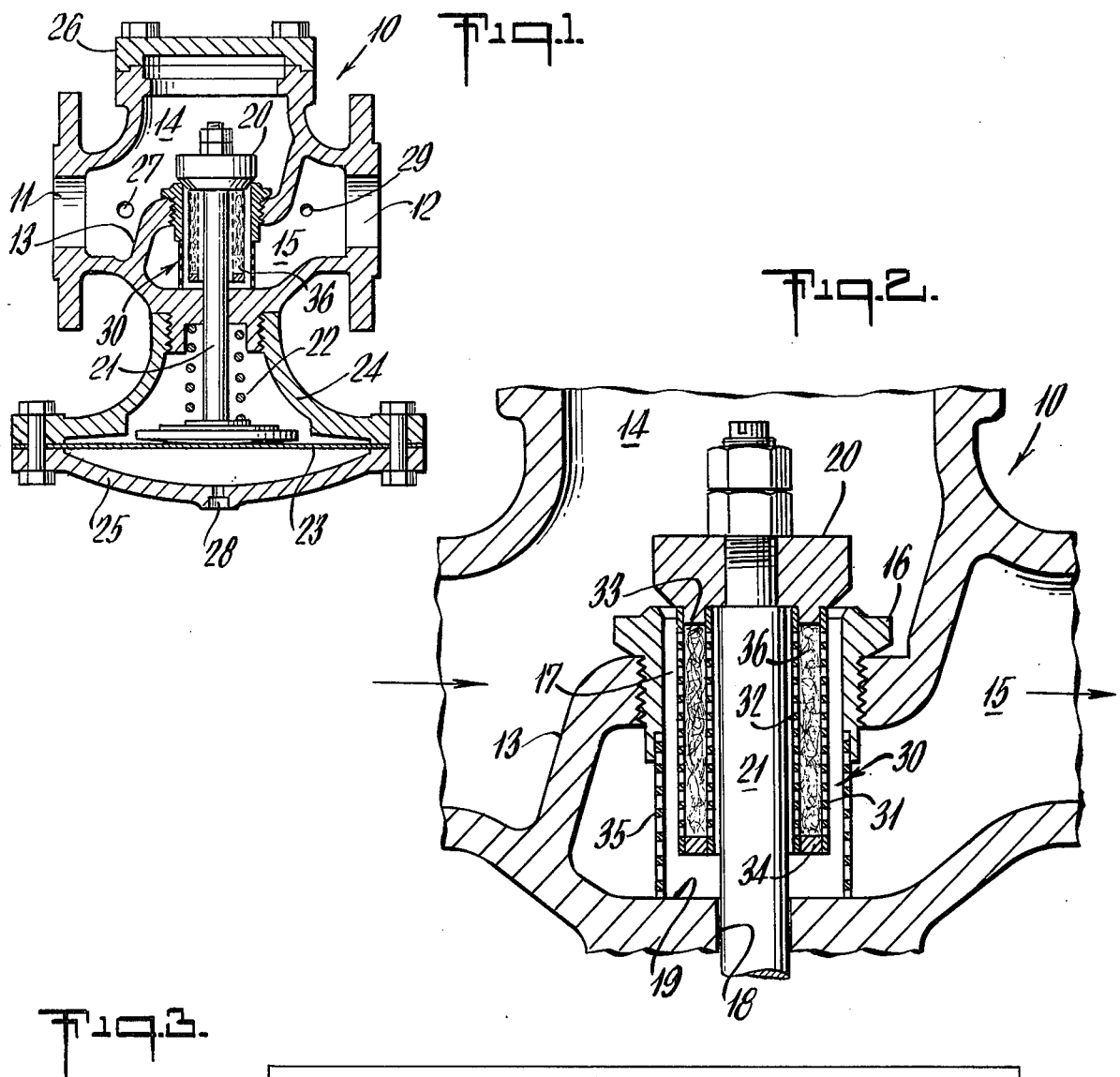
FIG. 1 is a vertical sectional view through a valve incorporating the invention, the parts being shown for the valve-closed condition.
FIG. 2 is an enlarged fragmentary, sectional view of the noise-reduction region of the valve of FIG. 1, the parts being shown for a valve-open condition.
FIG. 3 is a diagram graphically displaying comparative performance, for the valve of FIG. 1 in relation to prior art.

In FIG. 1, the invention is shown in application to a valve construction that is recognizable for reducing-valve application. The valve comprises a body 10 having inlet and outlet ports 11–12. A bridge 13 divides the interior of the body into an upstream chamber 14 and a downstream chamber 15. A flanged valve-seat ring 16 is threaded in its mount to a central opening of the bridge; ring 16 has a cylindrical bore 17 on the alignment axis of a valve-stem guide bore 18 through the base or floor region 19 of body 10, in the downstream chamber 15. A valve member 20 is secured to the reduced end of a valve stem 21, guided in bore 18 shown preloaded by spring means 22 to the valve-closed position. A diaphragm 23, clamped between a bonnet 24 and a cover 25, provides pressure-operated means for opening the valve, against the preload of spring 22. The basic valve structure is completed by a removable cover 26 for service access to valve member 20 and to seat ring 16, and by control ports 27–28 and a bleed port 29, all as utilized in regulating-valve application.

In accordance with the invention, sound-absorbing treatment is built into the described valve in the region immediately downstream from valve-member and valve-seat coaction, and the nature of such treatment is to avoid impediment to fluid flow by assuring a continuous flow passage downstream of member 20 and of at least maximum valve-open effective area. To meet this condition, sound-absorbing structure, designated generally at 30, is contained within a perforated outer cylinder 31, preferably of stainless steel, and of such outer diameter as to define with ring bore 17 an annular fluid-flow passage of ample dimensions. The sound-absorbing structure 30 is preferably carried by the underside of valve member 20, and structure 30 is further defined by an inner cylinder 32 which preferably clears stem 21 and is also perforated. Conveniently, a downwardly projecting annulus 33 of the downstream side of valve member 20 provides the means of concentrically securing both cylinders 31–32 at one end, while an annular element 34 secures the opposite ends of these cylinders. Within the space between cylinders, I have obtained highly satisfactory results using a packing of sound-absorbing material such as stainless-steel wool, for the case of steam flows.

The precise mechanism of the highly effective sound absorption achieved with my construction is not completely understood, but it is believed to be at least in part a function of the effective axial extent of the annular fluid-flow passage between cylinder 31 and the ring bore 17. As shown, this ring bore 17 is relatively elongate, but it is effectively extended in its overlap with the sound-absorbing structure 30, by providing a perforated skirt extension of bore 17; such extension may be a cylinder 35, secured in a counterbore in the downstream end of seat ring 16 and extending into contact or near-contact with the body floor 19 when ring 16 is fully assembled to bridge 13. The size of openings in cylinder 35 may be larger than those of cylinders 31–32, and the total effective area of the cylinder-35 openings preferably exceeds the effective passage area between cylinder 31 and the ring bore 17.

In a specific steam application of my invention to a valve, wherein the valve-seat bore 17 is of 1.5-inch diameter, the maximum valve-member opening was 0.78 in$^2$, and the annular passage between cylinder 31 and bore 17 was of about 0.85 in$^2$ effective sectional area. Cylinders 31–32 were of 22-gage stainless stainless steel, with perforations of about 0.031-inch diameter and spaced to provide about 40 percent open area. Cylinder 35 was of 11-gage stainless steel, with perforations of about 0.125-inch diameter and spaced to provide slightly more than 40 percent open area. The stainless steel wool compacted into the space between cylinders 31-32 had a density of 36 lbs/ft³ and is generally known as a medium-grade wool.

My best understanding of the operation of my sound-treated valve proceeds from the knowledge that noise is generated at fluid passage though the valve-member opening, with respect to seat ring 16. The flow is then directed through the open annular passage between cylinder 31 and bore 17, and the inner wall of this passage presents numerous openings for dissipating access of the sound waves to the sound-absorbent wool packing. Thus, the longer this passage, the more the attenuation of noise energy. And the space between stem 21 and the inner cylinder 32 provides for even further attenuation. The multihole cylindrical extension 35 of the seat ring 16 serves to extend the downward flow alongside cylinder 31 of the sound-absorbing structure 30, thereby increasing the area available for sound-wave attenuation. And of course, to a lesser extent, the large holes in cylinder 35 further break up the fluid stream and make their contribution to overall noise reduction.

FIG. 3 provides graphic illustration of the performance of my treated valve, in comparison with an untreated standard valve and with a so-called silent valve presently on the market, all three valves being of the same size and operated under the same conditions. The "silent" valve on the market relies upon series or path obstruction of flow, to achieve its noise reduction. Plainly, the "silent" valve on the market was unable to accomodate the higher flow rates which both the standard valve and the valve of the invention could handle. And plainly also, the valve of the invention produced approximately twice the magnitude of *db* reduction in noise, from the untreated, standard valve situation.

The described invention will be seen to have achieved all stated objects, with relative simplicity, low cost, and technical efficacy. Universality of design is available, and with greater performance capability; for example, the structure 30 does not require redesign, for use of any given valve size in a range of pressure-drop conditions. And for the larger-size valves where acoustic problems can be more severe, the annular design of the disclosed form is favored since there is greater available annular space in which to accommodate a correspondingly greater thickness and length of sound-absorbent material.

While the invention has been described in detail for a preferred form, it will be understood that modifications can be made without departure from the scope of the invention. For example, the use of stainless-steel wool and perforated-steel retaining walls is found to be effective but would not necessarily be most desired for all applications, and therefore the invention is not to be deemed limited to these particular materials.

What is claimed is:

1. In a valve, a valve body having inlet and outlet ports, a circular valve seat carried by said body between said ports and having an inner wall defining the outer confines of an axially extending annular passage on the downstream side of said seat for accommodation of valve-controlled fluid flow from the inlet port to the outlet port of said valve, a valve stem guided for reciprocation on the axis of said passage, a valve member carried by said stem for coaction with said seat, and an elongate cylindrical sound-absorbent structure on the downstream side of said valve member and within and spaced from said inner wall of said passage, said sound-absorbent structure including a perforated outer wall surface in radially opposed spaced relation to said inner wall and defining with said inner wall said annular passage for fluid flow downstream from said valve member, the spacing of said perforated wall surface from said inner wall being such as to establish a flow area in said passage of at least maximum valve-open effective area.

2. The valve of claim 1, in which said sound-absorbent structure is annular and surrounds said valve stem.

3. The valve of claim 2, in which said sound-absorbent structure is in radial clearance with said valve stem.

4. The valve of claim 1, in which said sound-absorbent structure is carried by said valve member.

5. The valve of claim 1, in which a cylindrical multihole orifice member of inner diameter at least substantially that of the inner wall of the valve seat extends between said seat and the adjacent wall of the valve body, said sound-absorbent structure being at least in partial axial overlap with said orifice member for all valve-member positions.

6. The valve of claim 1, in which said sound-absorbent structure comprises an outer perforated cylindrical metal shell, and sound-absorbent material within said shell.

7. The valve of claim 6, in which the sound-absorbent material includes compressed steel wool as the substantial component.

8. The valve of claim 7, in which said shell is of stainless steel and said sound-absorbent material is stainless-steel wool.

9. The valve of claim 1, in which said sound-absorbent structure comprises concentrically retained inner and outer perforated cylindrical metal shells, and sound-absorbent material in the space between said shells.

10. The valve of claim 9, in which said shells are secured at one end to said valve member, and an annular member securing the other ends of said shells.

11. In a valve, a valve body having an inner floor between inlet and outlet ports, a bridge dividing the interior of said body into an upstream chamber communicating with the inlet port and a downstream chamber communicating with the outlet port, said bridge spanning said floor in the downstream chamber and having a circular valve seat on an axis substantially normal to said floor, the valve seat portion of said bridge having an inner wall defining the outer confines of an axially extending annular passage for accommodation of fluid flow between said chambers, a valve member and means for coaxially positioning the same for coaction with said seat, and an elongate perforated cylindrical sound-absorbent structure within said passage and defining the inner confines of said annular passage, said sound-absorbent structure extending in approach to said floor, said sound-absorbent structure including a perforated outer wall surface in radially opposed spaced relation to said inner wall and defining with said inner wall said annular passage for fluid flow downstream from said valve member, the spacing of said perforated wall from said inner wall being such as to establish a flow area in said passage of at least maximum valve-open effective area.

12. The valve of claim 11, in which said valve seat is an annular member mounted to said bridge and having an elongate inner wall establishing an elongate annular fluid-flow passage discharging into the downstream chamber, the inner wall of said annular passage being defined by said sound-absorbent structure.

13. The valve of claim 12, in which a perforated cylindrical wall of inner diameter substantially matching that of said valve-seat inner wall is mounted to the downstream end of said valve-seat member and extends substantially to said floor.

14. The valve of claim 11, in which the sound-absorbent structure is mounted to and carried by said valve member.

15. The valve of claim 14, in which said sound-absorbent structure is generally cylindrically annular in shape.

16. The valve of claim 15, in which said means for coaxially positioning said valve member is an elongate valve stem reciprocably guided by said body on the downstream side of said bridge, the inner wall of said sound-absorbent structure being in radially spaced relation to said stem.

17. The valve of claim 12, in which a perforated cylindrical wall of inner diameter substantially matching that of said valve-seat inner wall is mounted to the downstream end of said valve-seat member and extends in substantial axial overlap with said sound-absorbent structure.

18. In a valve, a valve body having inlet and outlet ports, a circular valve seat carried by said body between said ports and having an inner wall defining the outer confines of an axially extending annular passage on the downstream side of said seat for accommodation of fluid flow from the inlet port to the outlet port of said valve, valve-member means for coaction with said seat and including a stem guided for reciprocation within and on the axis of said passage, and elongate annular porous sound-absorbent structure within said passage and carried by said valve-member means, said sound-absorbent structure including a cylindrical outer-wall surface with plural openings, the spacing of said outer wall surface from said inner wall surface being such as to establish a flow area in said passage of at least maximum valve-open effective area.

19. In a valve, a valve body having inlet and outlet ports, a circular valve seat carried by said body between said ports and having an inner wall defining the outer confines of an axially extending annular passage on the downstream side of said seat for accommodation of fluid flow from the inlet port to the outlet port of said valve, a valve stem guided for reciprocation on the axis of said passage, a valve member carried by said stem for coaction with said seat, and an elongate cylindrical sound-absorbent structure in spaced relation to and within said inner wall, said sound-absorbent structure comprising sound-absorbent material and means including an outer cylindrical retaining wall for said material, said retaining wall having plural openings for fluid exposure to said sound-absorbent material, and said retaining wall defining the inner confines of said annular passage, the spacing between said inner and outer confines being such as to establish a flow area in said passage of at least maximum valve-open effective area.

* * * * *